United States Patent [19]
Kato et al.

[11] Patent Number: 5,410,009
[45] Date of Patent: Apr. 25, 1995

[54] POLYURETHANEUREA ELASTOMER

[75] Inventors: Kaneyoshi Kato, Shizuoka; Yoshijiro Oyaizu, Shizuoka, both of Japan

[73] Assignee: Ihara Chemical Industry Co., Ltd., Tokyo, Japan

[21] Appl. No.: 82,368

[22] Filed: Jun. 28, 1993

[30] Foreign Application Priority Data

Jul. 2, 1992 [JP] Japan ................... 4-197501

[51] Int. Cl.$^6$ ............ C08G 18/46; C08G 18/50; C08G 18/76
[52] U.S. Cl. .................... 528/64; 528/63; 528/70; 528/74; 528/75; 528/76; 528/79; 528/80; 528/83; 528/84; 528/906
[58] Field of Search .......... 528/64, 70, 75, 76, 528/79, 80, 83, 84, 63, 74, 906

[56] References Cited

U.S. PATENT DOCUMENTS

| | | | |
|---|---|---|---|
| 3,681,290 | 8/1972 | Meckel et al. | 528/64 |
| 3,808,250 | 4/1974 | Blahak et al. | 528/68 |
| 3,817,940 | 6/1974 | Blahak et al. | 528/68 |
| 3,929,729 | 12/1975 | Chung | 264/236 |
| 3,929,863 | 12/1975 | Blahak et al. | 528/68 |
| 3,932,360 | 1/1976 | Cerankowski et al. | 521/163 |
| 4,039,514 | 8/1977 | van Gulick | 528/80 |
| 4,054,556 | 10/1977 | van Gulick | 521/163 |
| 4,246,392 | 1/1981 | Koike et al. | 528/64 |
| 4,328,322 | 5/1982 | Baron | 528/68 |
| 4,330,656 | 5/1982 | Grogler et al. | 528/74 |
| 4,504,648 | 3/1985 | Otani et al. | 528/76 |
| 4,521,582 | 6/1985 | Goyert et al. | 528/74 |
| 4,810,769 | 3/1989 | Casey et al. | 528/64 |
| 4,868,231 | 9/1989 | Leake et al. | 525/419 |
| 5,011,903 | 4/1991 | Lynburner et al. | 528/76 |
| 5,039,775 | 8/1991 | Oyaizu | 528/68 |
| 5,086,153 | 2/1992 | Oyaizu | 528/68 |
| 5,162,481 | 11/1992 | Reid et al. | 528/79 |
| 5,183,877 | 2/1993 | Swanson | 528/64 |

FOREIGN PATENT DOCUMENTS

| | | |
|---|---|---|
| 0032547 | 7/1981 | European Pat. Off. . |
| 0279376 | 8/1988 | European Pat. Off. . |
| 63-243122 | 10/1988 | Japan . |
| 2009764 | 6/1979 | United Kingdom . |

OTHER PUBLICATIONS

Week 1192, Derwent Publications Ltd., London GB; AN 92-086147 and JP-A-04031417 (Ihara) 3 Feb. 1992.
Week 0789, Derwent Publications Ltd., London GB; AN 89-051311 and JP-A-64 001715 (Kinoyosha) 6, Jan. 1989.

*Primary Examiner*—John Kight, III
*Assistant Examiner*—Rabon Sergent
*Attorney, Agent, or Firm*—Oblon, Spivak, McClelland, Maier & Neustadt

[57] ABSTRACT

A polyurethaneurea elastomer obtained by reacting a polyisocyanate component obtained by reacting 1,5-naphthalene diisocyanate with a polyol, with an amine component consisting essentially of an amine compound of the formula (1):

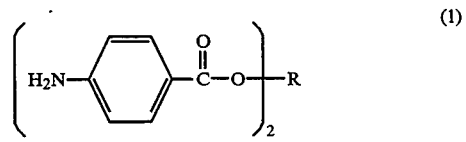

wherein R is a bivalent polyalkylene polyether or polyalkylene polyester having an average molecular weight of at least 200, which may contain unsaturated bonds in the polyalkylene.

7 Claims, No Drawings

POLYURETHANEUREA ELASTOMER

The present invention relates to a polyurethaneurea elastomer excellent in impact resilience and flexural properties, which is useful for industrial rolls, belts, blankets or industrial parts.

Heretofore, it is known to obtain a polyurethaneurea elastomer by using the same amine compound of the formula (1) as used in the present invention and a prepolymer and 4,4'-diphenylmethane diisocyanate (Japanese Unexamined Patent Publication No. 292317/1990).

However, the polyurethaneurea elastomer obtained by this method was poor in the impact resilience and flexural properties although it had good static properties, and it was not fully satisfactory for the intended use for industrial rolls, belts, blankets or industrial parts.

It is an object of the present invention to provide a polyurethaneurea elastomer having excellent dynamic properties such as impact resilience and flexural properties while maintaining good static properties.

The present inventors have conducted extensive researches to obtain a polyurethaneurea elastomer having excellent dynamic properties such as impact resilience and flexural properties while maintaining good static properties. As a result, it has been unexpectedly found that a polyurethaneurea elastomer obtained by reacting a polyisocyanate component obtained by reacting 1,5-naphthalene diisocyanate (hereinafter sometimes referred to as NDI) with a polyol, with an amine component consisting essentially of an amine compound of the following formula (1), has good static properties and yet has excellent impact resilience and flexural properties.

Further, a polyurethaneurea elastomer obtained by using in the above reaction an amine component having an aromatic diamine mixed to the amine compound of the formula (1), has excellent properties with the hardness and tensile strength further improved.

The present invention has been accomplished on the basis of these discoveries.

Thus, the present invention provides a polyurethaneurea elastomer obtained by reacting a polyisocyanate component obtained by reacting 1,5-naphthalene diisocyanate with a polyol, with an amine component consisting essentially of an amine compound of the formula (1):

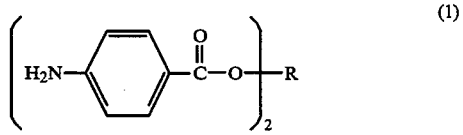

wherein R is a bivalent polyalkylene polyether or polyalkylene polyester having an average molecular weight of at least 200, which may contain unsaturated bonds in the polyalkylene.

The present invention also provides a polyurethaneurea elastomer obtained by reacting a polyisocyanate component obtained by reacting 1,5-naphthalene diisocyanate with a polyol, with an amine component consisting essentially of the amine compound of the formula (1) and an aromatic diamine mixed to the amine compound. The proportion of the aromatic diamine mixed is at most 100% by weight, based on the amine compound of the formula (1).

The polyurethaneurea elastomer of the present invention has excellent dynamic properties such as impact resilience and flexural properties while maintaining good static properties. By virtue of such excellent properties, it is most suitable for use as industrial rolls, belts, blankets or industrial parts which are required to have high levels of dynamic properties such as impact resilience and flexural properties, and it is capable of solving the problems inherent to the conventional polyurethaneurea elastomer used for such purposes.

Now, the present invention will be described in further detail with reference to the preferred embodiments.

The polyurethaneurea elastomer of the present invention can be produced by the following method. Namely, an amine component consisting essentially of an amine compound of the formula (1) alone, or such an amine compound and a predetermined amount of an aromatic diamine mixed thereto, is heated and completely dissolved. Then, this amine component is thoroughly defoamed under a reduced pressure of from 10 to 20 mmHg and cooled to room temperature. Then, it is added to a predetermined polyisocyanate component maintained at a temperature of from 70° to 120° C., preferably from 80° to 90° C., and the mixture is thoroughly mixed and defoamed. Then, the mixture is injected into a mold preheated to a temperature of from 80° to 120° C. and cured at that temperature for a few tens minutes. Then, the molded product is taken out from the mold and subjected to post curing in an oven set at a temperature of from 100° to 150° C. It is further aged at room temperature for about one week to obtain the desired polyurethaneurea elastomer.

The amine compound of the formula (1) to be used as the amine component in the production of a polyurethaneurea elastomer of the present invention may, for example, be polyethylene ether glycol bis(4-aminobenzoate), polytetramethylene ether glycol bis(4-aminobenzoate), polypropylene ether glycol bis(4-aminobenzoate), poly(oxyethylene-propylene ether)-glycol bis(4-aminobenzoate), polybutylene ether glycol bis(4-aminobenzoate), polyethylene adipate bis(4-aminobenzoate), polybutylene adipate bis(4-aminobenzoate) or polypropylene adipate bis(4-aminobenzoate).

The average molecular weight of the polyalkylene polyether moiety or polyalkylene polyester moiety at the central portion of such a compound (the structure of the moiety represented by R in the formula (1)) is always within a range of at least 200.

In the production of a polyurethaneurea elastomer of the present invention, a starting material having an aromatic diamine mixed to the amine compound of the formula (1) can be used as the amine component. The aromatic diamine to be mixed may have an optional substituent such as a halogen atom, an alkyl group, a trifluoromethyl group or an alkoxycarbonyl group introduced into its aromatic ring.

Examples of such an aromatic diamine include diaminodiphenylmethane type aromatic diamines of the formula (2):

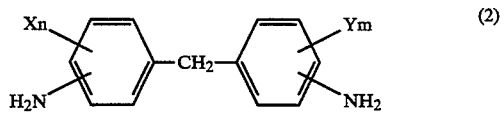

wherein each of X and Y which are independent of each other, is a halogen atom, an alkyl group which may be branched, a trifluoromethyl group, an alkoxycarbonyl group or a hydrogen atom, and each of n and m which are independent of each other, is an integer of from 1 to 4, provided that when n and/or m is at least 2, a plurality of X and/or Y which are independent of one another, may be the same or different, such as 4,4'-methylenebisaniline, 4,4'-methylenebis(2-chloroaniline), 4,4'-methylenebis(2,3-dichloroaniline) (TCDAM), 4,4'-methylenebis(2,5-dichloroaniline), 4,4'-methylenebis(2-methylaniline), 4,4'-methylenebis(2-ethylaniline), 4,4'-methylenebis(2-isopropylaniline), 4,4'-methylenebis(2,6-dimethylaniline), 4,4'-methylenebis(2,6-diethylaniline), 4,4'-methylenebis(2-ethyl-6-methylaniline), 4,4'-methylenebis(2-chloro-6-methylaniline), 4,4'-methylenebis(2-chloro-6-ethylaniline), 4,4'-methylenebis(3-chloro-2,6-diethylaniline), 4,4'-methylenebis(2-trifluoromethylaniline) and 4,4'-methylenebis(2-methoxycarbonylaniline), and aminobenzoate type aromatic diamines of the formulas (3) and (4):

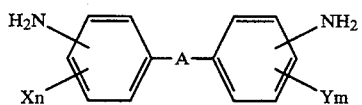
(3)

wherein A is a group of the formula —CO—O—(CH$_2$)$_i$—O—CO— or —CO—(OCH$_2$CH$_2$)$_i$—O—CO— wherein i is an integer of from 1 to 4, and X, Y, n and m are as defined above, provided that when n and/or m is at least 2, a plurality of X and/or Y which are independent of one another, may be the same or different,

(4)

wherein R' is a lower alkyl group which may be branched, n' is an integer of from 1 to 3, and X is as defined above, such as 1,3-propanediolbis(4-aminobenzoate), 1,4-butanediolbis(4-aminobenzoate), diethylene glycol bis(4-aminobenzoate), triethylene glycol bis(4-aminobenzoate), isopropyl 4-chloro-3,5-diaminobenzoate and isobutyl 4-chloro-3,5-diaminobenzoate.

These aromatic diamines may be used alone or in combination as a mixture of two or more of them.

In a case where the aromatic diamine is used in combination with the amine compound of the formula (1) as the amine component in the production of a polyurethaneurea elastomer of the present invention, the mixing ratio of the aromatic diamine varies depending upon the desired physical properties and operation efficiency. However, it is usually at most 50% by weight in the amine component (a mixture of the amine compound of the formula (1) and the aromatic diamine), i.e. the aromatic diamine being at most 100% by weight relative to the amine compound of the formula (1), preferably at most 30% by weight in the amine component, i.e. the aromatic diamine being at most 42.9% by weight relative to the amine compound of the formula (1).

If the aromatic diamine exceeds 50% by weight in the amine component, the mixed solution of the amine compound of the formula (1) and the aromatic diamine tends to be hardly maintained in a liquid state, or even if it can be maintained in a liquid state, the solution tends to be highly viscous, whereby handling and molding operations tend to be difficult, and the pot life during the molding tends to be short and it tends to be difficult to obtain a molded product.

The polyisocyanate component to be used for the production of a polyurethaneurea elastomer of the present invention may, for example, be a reaction product having isocyanate groups at both terminals and having the chain extended by urethane bonds, which is obtained by reacting 1,5-naphthalene diisocyanate (NDI) with a predetermined amount of a polyol of the formula (5):

(5)

wherein R$^2$ is as defined above.

Here, specific examples of the polyol compound of the formula (5) include aliphatic polyester glycols obtained by condensing an aliphatic glycol with a dicarboxylic acid for chain extension, such as polyethylene adipate, polybutylene adipate and polypropylene adipate, polyalkylene ether glycols obtained by ring-opening polymerization of ethylene oxide, propylene oxide, tetrahydrofuran, etc., such as polyethylene ether glycol, polypropylene ether glycol and polytetramethylene ether glycol, polyester glycols obtained by ring-opening polymerization of ε-caprolactone, polyol compounds obtained by hydroxylating the terminal groups of polybutadiene, polyol compounds obtained by copolymerizing a copolymer of at least two alkylene oxides with at least two glycols and dicarboxylic acids, and long chain diols such as a mixture of aromatic glycols.

The proportions of the 1,5-naphthalene diisocyanate and the polyol of the formula (5) in the polyisocyanate component used for the production of a polyurethaneurea elastomer of the present invention are usually such that the molar ratio of isocyanate groups (—NCO) to hydroxyl groups (—OH) i.e. —NCO/—OH is from 1.1 to 5.0, preferably from 2.8 to 4.3.

Further, the mixing ratio of the amine component to the isocyanate component for the production of a polyurethaneurea elastomer of the present invention is usually such that the molar ratio of isocyanate groups (—NCO) to amino groups (—NH$_2$) i.e. —NCO/—NH$_2$ (NCO index) is from 0.9 to 1.5, preferably from 1.0 to 1.3.

To the polyurethaneurea elastomer of the present invention, additives commonly used for a polyurethane elastomer, such as an antioxidant, an ultraviolet absorber, a coloring-preventive agent, a hydrolysis-preventing agent, antifungul agent, a flame retardant, a colorant and a bulking agent, may be incorporated as the case requires.

The amine compound of the formula (1) to be used for the production of a polyurethaneurea elastomer of the present invention can be prepared, for example, by the methods disclosed in Japanese Examined Patent Publication No. 32641/1985 and Japanese Unexamined Patent Publication No. 135514/1981.

Namely, the amine compound of the formula (1) can be prepared by reacting a polyol compound of the formula (5) with two equivalent of p-nitrobenzoyl chloride in the presence of a hydrochloric acid-removing agent, and the obtained nitro compound is reduced by a usual method.

Otherwise, the amine compound of the formula (1) can be prepared by an ester exchange reaction of two equivalents of an alkyl p-aminobenzoate with a polyol compound of the formula (5). In this reaction, an amino benzoic acid and an aliphatic polyol compound can be used instead of the alkyl aminobenzoate.

In such a reaction to obtain the amine compound of the formula (1), hydroxyl groups may sometimes partially remain at the terminals depending upon the reaction conditions or a change in the molar ratio of the starting materials, but such a product may be used as it is, without creating any particular problem.

The polyurethaneurea elastomer of the present invention has excellent dynamic properties such as impact resilience and flexural properties while maintaining good static properties and can be readily produced by reacting a polyisocyanate component obtained by reacting 1,5-naphthalene diisocyanate with the polyol, with an amine component consisting essentially of an amine compound of the formula (1) alone, or such an amine compound and an aromatic diamine mixed thereto.

By virtue of the excellent properties, the polyurethaneurea elastomer of the present invention is most suitable for e.g. industrial rolls, belts, blankets or industrial parts which are required to have high levels of the dynamic properties such as impact resilience and flexural properties, and it solves the problems inherent to the conventional polyurethaneurea elastomer used for such purposes.

Now, the present invention will be described in further detail with reference to Examples. However, it should be understood that the present invention is by no means restricted by such specific Examples.

Firstly, preparation of the amine compound of the formula (1) will be described.

PREPARATION EXAMPLE 1

Into a 5 l four-necked flask equipped with a thermometer, a condenser, a dropping funnel and a stirrer, 970 g (1.0 mol) of a polytetramethylene ether glycol having an average molecular weight of 970, 242.5 g (2.4 mol) of triethylamine and 1 l of toluene were charged to obtain a reaction solution. On the other hand, 390 g (2.1 mol) of p-nitrobenzoyl chloride was dissolved in 1 l of toluene to obtain a dropping solution. The above reaction solution was heated to a temperature of from 40° to 50° C. under stirring, and the dropping solution prepared as described above, was dropwise added thereto over a period of one hour. After completion of the dropwise addition, the reaction solution was heated, and an aging reaction was conducted under reflux for 1.5 hours. The reaction solution was left to cool and then filtered to remove precipitated triethylamine hydrochloride. The filtrate was washed with a 5% potassium carbonate aqueous solution and water and then concentrated under reduced pressure to obtain a dinitro intermediate as a yellow transparent viscous liquid. The amount was 1217.5 g, and the yield was 96.0%.

Then, into a 10 l four-necked flask equipped with a thermometer, a condenser, a dropping funnel and a stirrer, 614 g (11.0 mol) of iron powder, 30 g of acetic acid, 2.5 l of toluene and 1 l of water were charged. On the other hand, the dinitro intermediate obtained by the above reaction was dissolved in 1 l of toluene to obtain a dropping solution. This dropping solution was dropwise added over a period of 1.5 hours while the reaction solution was heated by an oil bath and refluxed under stirring. After completion of the dropwise addition, the mixture was aged at the same temperature for 5 hours to complete the reaction. To the reaction mixture thus obtained, sodium hydrogencarbonate was added to neutralize acetic acid, and the mixture was filtered while it was still hot, to remove the iron sludge. Further, water was separated by liquid separation. The obtained organic layer was washed with water and then concentrated under reduced pressure to obtain the desired polytetramethylene ether glycol bis(4-aminobenzoate).

The desired product was a pale yellowish brown transparent viscous liquid, and the amount was 1078.7 g and the yield was 93.0%. Further, the amine value was 89.0 KOHmg/g, and the OH value was 2.3 KOHmg/g.

PREPARATION EXAMPLE 2

Into a 1 l four-necked flask equipped with a thermometer, a water separator having a condenser and a stirrer, 194 g (0.2 mol) of a polytetramethylene ether glycol having an average molecular weight of 970, 65.9 g (0.4 mol) of ethyl p-aminobenzoate and 0.018 g of tetrabutyl titanate were charged to obtain a reaction solution. The reaction solution was heated to 200° C. under stirring in a nitrogen stream to distill off ethyl alcohol. The distilled ethyl alcohol was 82% of the theoretical amount. Further, the temperature was raised to 215° C., and aging was conducted for 2 hours. Then, non-reacted ethyl p-aminobenzoate was distilled off under reduced pressure to obtain the desired polytetramethylene ether glycol bis(4-aminobenzoate).

The desired product was a brown viscous liquid, and the amount was 224.7 g and the yield was 93.0%. Further, the amine value was 81.4 KOHmg/g, and the OH value was 14.5 KOHmg/g.

Now, the present invention will be described in further detail with reference to Examples and Comparative Examples.

EXAMPLE 1

Into a 500 ml separable flask equipped with a thermometer and a stirrer, 100 parts by weight of a polytetramethylene ether glycol having an average molecular weight of 1942 was charged and heated to 120° C. under stirring, and water was removed under reduced pressure of 5 mmHg for one hour. Then, it was cooled to 100° C. While blowing nitrogen into it, 30 parts by weight of 1,5-naphthalene diisocyanate was charged, and the mixture was reacted at 125° C. for about 20 minutes. Then, the mixture was cooled to 90° C. and defoamed. The NCO content of the obtained polyisocyanate component was 5.9% by weight.

To the polyisocyanate component cooled to 90° C., 109.6 parts by weight of the polytetramethylene ether glycol bis(4-aminobenzoate) at room temperature obtained in Preparation Example 1 was added, followed by defoaming. This mixture was injected into a casting mold preliminarily heated to a temperature of 100° C. and cured for 15 minutes. Then, the molded product was taken out from the mold and subjected to post curing for 8 hours in a forcibly air-circulating oven set at a temperature of 120° C. and then aged at room temperature for one week to obtain a polyurethaneurea elastomer. The production conditions of the polyurethaneurea elastomer thus obtained and the physical properties of the obtained polyurethaneurea elastomer are shown in Table 1.

The physical properties were measured in accordance with JIS K6301.

Further, the De Mattia flex property was measured by bending a notched specimen and represented by the number of bending cycles when cracking reached 100%.

EXAMPLE 2

Using the polytetramethylene ether glycol bis(4-aminobenzoate) obtained in Preparation Example 2, a polyurethaneurea elastomer was prepared in the same manner as in Example 1.

The production conditions of the polyurethaneurea elastomer thus obtained and the physical properties of the obtained polyurethaneurea elastomer are shown in Table 1.

EXAMPLE 3

Using an amine component obtained by mixing 8.0 parts by weight of 4,4'-methylenebis(2-chloroaniline) to 71.9 parts by weight of the polytetramethylene ether glycol bis(4-aminobenzoate) obtained in Preparation Example 1, a polyurethaneurea elastomer was prepared in the same manner as in Example 1.

The production conditions of the polyurethaneurea elastomer thus obtained and the physical properties of the obtained polyurethaneurea elastomer are shown in Table 1.

EXAMPLE 4

Using a poly(3-methylpentamethylene)glycol adipate having an average molecular weight of 1941, a polyurethaneurea elastomer was prepared in the same manner as in Example 1.

The production conditions of the polyurethaneurea elastomer thus obtained and the physical properties of the obtained polyurethaneurea elastomer are shown in Table 1.

COMPARATIVE EXAMPLE 1

Into a 500 ml separable flask equipped with a thermometer and a stirrer, 100 parts by weight of a polytetramethylene ether glycol having an average molecular weight of 970 was charged and heated to 70° C. under stirring while blowing nitrogen thereinto. Then, 51.6 parts by weight of 4,4'-diphenylmethane diisocyanate (MDI) was charged, and the mixture was reacted for 2 hours and defoamed. The NCO content in the polyisocyanate component thus obtained was 5.3% by weight. Then, 37.9 parts by weight of liquid MDI (MDI was liquefied by partially carbodiimide-modifiying MDI) was mixed thereto at room temperature to obtain a polyisocyanate component.

To this polyisocyanate component, an amine component obtained by mixing 23.7 parts of 4,4'-methylenebis(2-chloroaniline) to 157.9 parts by weight of the polytetramethylene ether glycol bis(4-aminobenzoate) obtained in Preparation Example 1 at room temperature, was mixed, followed by defoaming. Then, the mixture was injected into a casting mold preliminarily heated to 100° C. and cured for 15 minutes. The molded product was removed from the mold and then subjected to post curing for 4 hours in a forcibly air-circulating oven set at 150° C. and then aged at room temperature for one week to obtain a polyurethaneurea elastomer.

The production conditions of the polyurethaneurea elastomer thus obtained and the physical properties of the obtained polyurethaneurea elastomer are shown in Table 1.

TABLE 1

|  |  | Example 1 | Example 2 | Example 3 | Example 4 | Comparative Example |
|---|---|---|---|---|---|---|
| Amine component | | | | | | |
| Amine compound | Polytetramethylene ether glycol bis(4-aminobenzoate) | | | | | — |
| | Prepared in Preparation Example 1 | 109.6 | | 71.9 | 109.6 | 157.9 |
| | Prepared in Preparation Example 2 | | 119.9 | | | |
| Aromatic diamine | 4,4'-Methylenebis(2-chloroaniline) | | | 8.0 | | 23.7 |
| Poly-isocyanate component | | | | | | |
| Polyol | Polytetramethylene ether glycol (Mw 1942) | 100 | 100 | 100 | | |
| | Poly(3-methylpentamethylene)glycol adipate (Mw 1941) | | | | 100 | |
| | Polytetramethylene ether glycol (Mw 970) | | | | | 100 |
| Diisocyanate | 1,5-phthalene diisocyanate | 30 | 30 | 30 | 30 | |
| | 4,4'-diphenylmethane diisocyanate | | | | | 51.6 |
| Isocyanate | Liquid 4,4'-diphenylmethane diisocyanate | | | | | 37.9 |
| Mixing and curing conditions | Mixing temp. (°C.) | | | | | |
| | (Amine component) | RT* | RT* | RT* | RT* | RT* |
| | (Polyisocyanate component) | 90 | 90 | 90 | 90 | RT* |
| | Molar ratio of NCO/NH$_2$ (NCO index) | 1.05 | 1.05 | 1.05 | 1.05 | 1.05 |
| | Curing temp. (°C.) | 100 | 100 | 100 | 100 | 100 |
| | Curing time (min) | 15 | 15 | 15 | 15 | 15 |
| | Post curing temp. (°C.) | 120 | 120 | 120 | 120 | 150 |
| | Post curing time (min) | 8 | 8 | 8 | 8 | 4 |
| Operation efficiency | Pot life (min) | 4.5 | 4.5 | 2.5 | 4.5 | 10 |
| | Mold removal time (min) | 20 | 20 | 20 | 20 | 9 |
| Physical properties | Hardness (Shore A) | 90 | 90 | 92 | 91 | 93 |
| | Tensile strength (kg/cm$^2$) | 327 | 320 | 503 | 350 | 518 |
| | Elongation (%) | 800 | 700 | 720 | 750 | 450 |
| | Tear strength (kg/cm) | 105 | 102 | 113 | 107 | 122 |
| | Impact resilience (%) | 72 | 70 | 67 | 70 | 50 |
| | De Mattia flex life (notched) ×10$^3$ cycles) | >160 | >160 | >160 | >160 | 5 |

*RT: room temperature

We claim:

1. A polyurethaneurea elastomer obtained by reacting a polyisocyanate component obtained by reacting 1,5-naphthalene diisocyanate with a polyol, with an amine component consisting essentially of an amine compound of the formula (1):

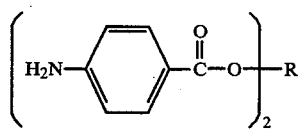

wherein R is a bivalent polyalkylene polyether or polyalkylene polyester having an average molecular weight of at least 200, which optionally contains unsaturated bonds in the polyalkylene.

2. A polyurethaneurea elastomer obtained by reacting a polyisocyanate component obtained by reacting 1,5-naphthalene diisocyanate with a polyol, with an amine component consisting essentially of an amine compound of the formula (1):

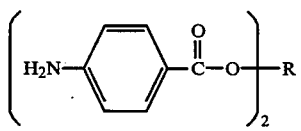

wherein R is a bivalent polyalkylene polyether or polyalkylene polyester having an average molecular weight of at least 200, which optionally has unsaturated bonds in the polyalkylene, and an aromatic diamine different from said amine compound of formula (1) mixed to said amine compound.

3. The polyurethaneurea elastomer according to claim 2, wherein the proportion of the aromatic diamine mixed is at most 100% by weight, based on the amine compound of the formula (1).

4. The polyurethaneurea elastomer according to claim 2 or 3, wherein the aromatic diamine is at least one aromatic diamine selected from the group consisting of aromatic diamines of the formula (2):

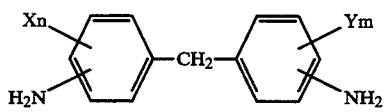

wherein each of X and Y which are independent of each other, is a halogen atom, an alkyl group which optionally is branched, a trifluoromethyl group, an alkoxycarbonyl group or a hydrogen atom, and each of n and m which are independent of each other, is an integer of from 1 to 4, provided that when either or both of n or m is at least 2, a plurality of X or Y or both, which are independent of one another, may be the same or different, and aromatic diamines of the formulas (3) and (4):

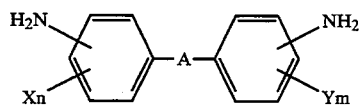

wherein A is a group of the formula $-CO-O-(CH_2)_i-O-CO-$ or $-CO-(OCH_2CH_2)_i-O-CO-$ wherein i is an integer of from 1 to 4, and X, Y, n and m are as defined above, provided that when either or both of n or m is at least 2, a plurality of X or Y or both which are independent of one another, may be the same or different,

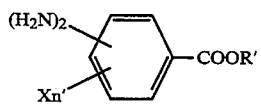

wherein R' is a lower alkyl group which optionally is branched, n' is an integer of from 1 to 3, and X is as defined above.

5. The polyurethaneurea elastomer according to claim 2 or 3, wherein the aromatic diamine is at least one aromatic diamine selected from the group consisting of 4,4'-methylenebisaniline, 4,4'-methylenebis(2-chloroaniline), 4,4'-methylenebis(2,3-dichloroaniline), 4,4'-methylenebis(2,5-dichloroaniline), 4,4'-methylenebis(2-methylaniline), 4,4'-methylenebis(2-ethylaniline), 4,4'-methylenebis(2-isopropylaniline), 4,4'-methylenebis(2,6-dimethylaniline), 4,4'-methylenebis(2,6-diethylaniline), 4,4'-methylenebis(2-ethyl-6-methylaniline), 4,4'-methylenebis(2-chloro-6-methylaniline), 4,4'-methylenebis(2-chloro-6-ethylaniline), 4,4'-methylenebis(3-chloro-2,6diethylaniline), 4,4'-methylenebis(2-trifluoromethylaniline), 4,4'-methylenebis(2-methoxycarbonylaniline), 1,3-propanediolbis(4-aminobenzoate), 1,4-butanediolbis(4-aminobenzoate), diethylene glycol bis(4-aminobenzoate), triethylene glycol bis(4-aminobenzoate), isopropyl 4-chloro-3,5-diaminobenzoate and isobutyl 4-chloro-3,5-diaminobenzoate.

6. The polyurethaneurea elastomer according to claim 1, 2, 3, 4 or 5, wherein the polyol is a polyol compound of the formula (5):

     (5)

wherein $R^2$ is a bivalent polyalkylene polyether or polyalkylene polyester having an average molecular weight of at least 200, which optionally has unsaturated bonds in the polyalkylene.

7. The polyurethaneurea elastomer according to claim 1, 2, 3, 4 or 5, wherein the polyol is at least one polyol compound selected from the group consisting of aliphatic polyester glycols obtained by condensing an aliphatic glycol with a dicarboxylic acid polyalkylene ether glycols obtained by ring-opening polymerization of a polyalkylene oxide or polyalkylene intramolecular cyclic ether, polyester glycols obtained by ring-opening polymerization of ε-caprolactone, polyol compounds obtained by hydroxylating the terminal groups of a polybutadiene, polyol compounds obtained by copolymerizing least two alkylene oxides with at least two glycols and dicarboxylic acids, and mixtures of aromatic glycols.

* * * * *